(No Model.)
H. E. KEELER.
FANNING MILL.
No. 254,140. Patented Feb. 28, 1882.
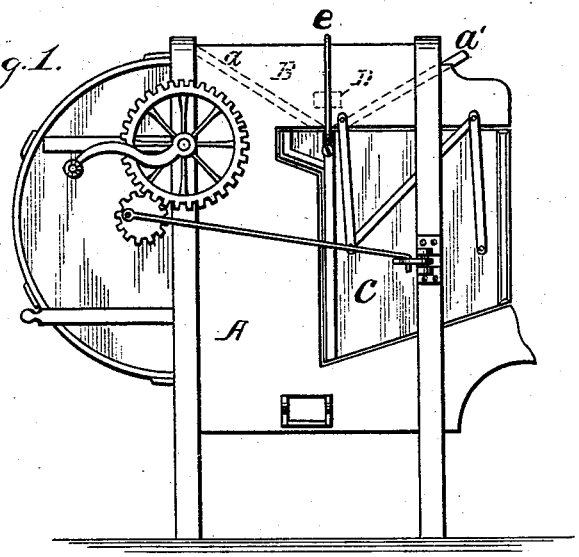
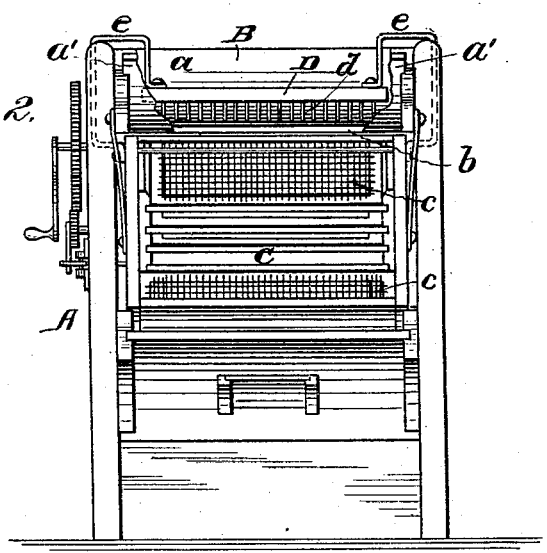
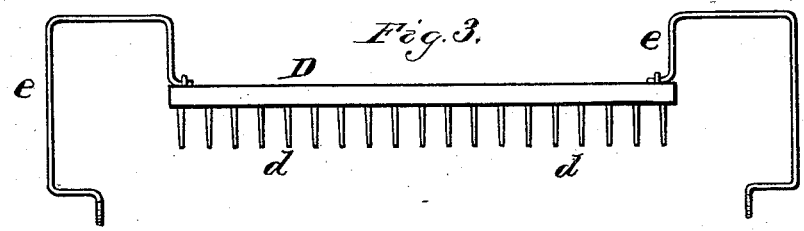
Witnesses.
Henry Frankfurter.
Inventor.
Herbert E. Keeler.
per F. F. Warner his Attorney.

UNITED STATES PATENT OFFICE.

HERBERT E. KEELER, OF LA CROSSE, WISCONSIN.

FANNING-MILL.

SPECIFICATION forming part of Letters Patent No. 254,140, dated February 28, 1882.

Application filed April 28, 1881. (No model.)

*To all whom it may concern:*

Be it known that I, HERBERT E. KEELER, of La Crosse, in the county of La Crosse and State of Wisconsin, have invented certain new and useful Improvements in Fanning-Mills, of which the following, in connection with the accompanying drawings, is a specification.

In the drawings, Figure 1 is a side elevation of a fanning-mill to which my invention is applied. Fig. 2 is a front elevation of the same, and Fig. 3 is a detail of that part which constitutes the principal feature of my invention.

Like letters of reference indicate like parts.

Heretofore in grain and seed cleaning machines it has been difficult to adjust the feed or regulate the passage of the grain or seed through the hopper, so that the proper quantity would fall continually and regularly upon the sieves. This difficulty resulted greatly from the tendency of the straws, sticks, and chaff left in the grain by the thrashing-machine to lodge in and across the throat or opening in the bottom of the hopper, and by gradually accumulating there until the flow or feeding of the grain or seeds was thereby interrupted to a greater or less extent. It has been on this account necessary to exercise much care in order to keep the throat of the hopper clean, and this has been done by hand with the aid of a stick or other suitable utensil. The same result has also been accomplished by means of movable teeth projecting upward into and through the throat or opening in the hopper; but these teeth have prevented a complete closing of the hopper by means of the slide-valve commonly employed for that purpose. It is sometimes desirable to wholly close the hopper while the machine is running; and the object of my invention is to employ these teeth in such a way that the hopper may then be entirely closed, if need be.

My invention consists in the means, substantially as hereinafter specified, which I use for the purpose of accomplishing the object above set forth.

A represents an ordinary fanning-mill.

B is the hopper, the bottom of which consists of two inclined boards, *a* and *a'*, the inner or lower ends or edges of which meet or nearly meet each other. The rear or outer board, *a'*, is commonly supported in grooves or ways, and is adjustable to and from the board *a*, so that the space between the inner or lower edges of these boards may be varied or regulated, and various devices have been used to aid this adjustment. This space or opening between the inner or lower edges of the boards *a* and *a'* is what I have termed the "throat" or opening in the bottom of the hopper, and its position is indicated at *b*.

C is the shoe, which contains the sieves *c c*, and which is vibrated or agitated in such a way as to aid the passage of the grain or seeds through and over the sieves.

I have not here shown and described with particularity these well known and common features of construction, as my invention does not relate thereto, but to the means adapted to be used in connection therewith for the purposes set forth, which means I will now proceed to describe.

D is a bar, from which teeth or fingers *d d* depend. The part D is so arranged in the hopper B that the lower ends of the teeth or fingers *d d* will extend along or near the throat *b*, as indicated. The length of the bar D is also such as to permit it to be moved back and forth laterally a little way in the hopper. I produce this lateral movement by connecting the bar D either to the shoe or to some other part which will so move it; and *e e* are connecting-arms employed for the purpose of connecting said bar to such a part.

It will be perceived from the foregoing description and from reference to the drawings that if the bar D be moved back and forth laterally, as set forth, the teeth or fingers *d d* will catch or turn straws and sticks, so that they will be presented to the throat *b* in such a way as to pass through it, and that the grain or seeds will also be so agitated by the movement of the teeth or fingers *d d* that clogging at the throat *b* will be prevented.

It is evident that the device D *d d* is adapted for use as an attachment for the class of grain-cleaning machines herein referred to without changing the construction of the machine, and without further manipulation of the attachment than may be necessary in order to apply it to the machine.

In machines in which there is a longitudinally-vibrating shoe the bar D may be connected to some other movable part, if deemed best, and in any suitable way.

Having thus described my invention, what I claim as new, and desire to secure by Letters Patent, is—

The combination, in a grain-cleaning machine, of the hopper B, having a contractible throat or opening, $b$, the laterally-vibrating shoe C, and the bar D, provided at its ends with the arms $e\ e$, connected to the shoe, and the said bar having therein the depending teeth or fingers $d\ d$, the lower ends of which are arranged above the said throat or opening, substantially as and for the purposes specified.

HERBERT E. KEELER.

Witnesses:
J. S. FLETCHER,
J. H. SIERMAN.